Patented Apr. 23, 1935

1,998,471

UNITED STATES PATENT OFFICE 1,998,471

PROCESS OF PURIFYING CONCENTRATED CAUSTIC SODA SOLUTIONS

Raymon E. Van der Cook, Inkster, and Earl Sweetland, Grosse Isle, Mich., assignors to Pennsylvania Salt Manufacturing Company, Philadelphia, Pa., a corporation of Pennsylvania No Drawing. Application February 17, 1934, Serial No. 711,784

12 Claims. (Cl. 23—184)

The present invention relates to a process of purifying concentrated caustic soda solutions, and more particularly it relates to a process for the removal of contaminating sodium chloride therefrom in which the ingredient employed in the removal of the sodium chloride may be economically and easily recovered, and thus made available for further use in the process.

The principal object of our invention is to provide a process for the purification of concentrated caustic soda solutions which not only involves the separation of the sodium chloride therefrom in the form of a substantially insoluble complex salt, due to the addition of sodium sulphate to the solution, but also involves the subsequent separation of the sodium sulphate from the complex salt in a form available for further use.

Another object of our invention is to provide a cyclic process for the purification of concentrated caustic soda solutions by which the sodium sulphate employed in the purification may be recovered and returned to the process for use in the purification of further amounts of concentrated caustic soda solutions.

Other objects will be apparent from a consideration of the specification and claims.

A process for the purification of caustic soda solutions is described and claimed in United States Letters Patent No. 1,888,886, granted November 22, 1932. The process there disclosed involves the addition of sodium sulphate or a compound forming sodium sulphate to concentrated caustic soda solutions in order to form with the sodium chloride a complex salt substantially insoluble in the caustic soda solution. The present process also relies on the same chemical reaction for the purification, but is a marked improvement on the process disclosed in the patent. The complex salt removed from the caustic soda solutions in accordance with the process of the patent represents a loss in the process, and hence the process, due to the high consumption of sodium sulphate, is not economical. When it is realized that a plant producing fifty tons of solid caustic soda per day may well consume two to five tons of sodium sulphate, depending upon operating requirements, it willl be seen that the cost of the process is high. In accordance with the present process, 85% to 90% of the sodium sulphate used is recovered and made available for the purification of additional amounts of concentrated caustic soda solutions.

The process of the present invention is applicable for the treatment of caustic soda solutions, to remove sodium chloride therefrom, whose concentrations are such that the complex salt formed upon the addition of sodium sulphate will be substantially insoluble therein, and the terms "concentrated caustic soda solutions" is employed to include all these concentrations. The process is particularly applicable for treatment of solutions of caustic soda containing 36% to 39% Na₂O (by weight) which have been evaporated to this concentration from lower concentrations and from which the impurities such as sodium chloride, as far as possible, have been removed.

The process of the present invention contemplates the addition of sodium sulphate, preferably anhydrous, to the concentrated caustic soda solution to be purified. At the start of the process, in place of sodium sulphate itself, compounds forming sodium sulphate in the solution such as sulphuric acid, sodium hydrogen sulphate, or those metallic sulphates which will react with caustic soda to form sodium sulphate and the insoluble hydroxide may be used. The amount of sodium sulphate supplied to the concentrated caustic soda solution to be purified is dependent upon the amount of sodium chloride in the solution to be removed therefrom in the form of the complex salt whose formula appears to be

$NaOH \cdot NaCl \cdot Na_2SO_4$, although the ratio of the individual components in the complex salt may vary slightly from this formula, for example, it may be

$4NaOH \cdot 4NaCl \cdot 5Na_2SO_4$.

Taking the first formula as typical, it will be seen that the minimum amount required when complete removal is desired is 2.43 parts of sodium sulphate for each part of sodium chloride in the solution. In some cases, it may be desirable to remove only part of the sodium chloride in the caustic soda solution, in which case the complex salt formed will be dependent on the amount of sodium sulphate added under the theoretical ratio. If sodium sulphate is added in amounts in excess of the theoretical ratio, the sodium chloride will be substantially completely removed. Often it is desirable from an operating standpoint to employ three to four parts of sodium sulphate to each part of sodium chloride in the solution, although in other instances the use of as high as ten to twelve parts of sodium sulphate to each part of sodium chloride in the solution will be found to be advantageous, since with a substantial excess, the rate of formation of the complex salt is increased. The complex salt is formed upon the addition of the sodium sulphate, and in order to complete the reaction, it is desirable that the sodium sulphate and the solution remain in contact, preferably with agitation, for a period of time, for example, one hour or more. The crystalline complex salt which is substantially insoluble in the concentrated caustic soda solution is removed therefrom by filtering or by settling and decantation. In the latter case, it may also be desirable to subject the recovered solids to a filtering operation to free them of the large amount of liquid that may be associated therewith, prior to the subsequent steps.

The complex salt separated from the solution is then treated with a selective solvent in such proportions with respect to the amount of complex salt that sodium chloride is to some extent at least dissolved therefrom, leaving at least some of the sodium sulphate of the complex salt undissolved. If water or an aqueous solution is employed in the treatment, a temperature above that at which Glauber's salt is formed, for example a temperature of above 34° C. is used. Preferably the selective solvent is employed in the percentage which will give the maximum solubility of the sodium chloride while providing minimum solubility of the sodium sulphate, although it will be understood that the process is of value even though some sodium sulphate is not recovered, or on the other hand even though the sodium sulphate is to some extent contaminated by sodium chloride.

The complex salt, in addition to having caustic soda as one component, contains caustic soda solution absorbed thereby since it is not practical to remove the last traces of adhering caustic liquor. The concentration of caustic soda in the solution obtained after treatment with the added solvent has been found to afford a means of control for determining the efficiency of the separation of the sodium chloride from the sodium sulphate. The caustic soda solution, itself, materially effects the solubilities of the two salts which it is desired to separate and may, therefore, be considered as the selective solvent rather than the water added. In certain instances, when the amount of absorbed or adhering caustic soda solution is low, it will be of advantage to add a dilute solution of caustic soda, for example, a 10% solution in place of water alone to bring up the caustic soda content in the solution obtained after treating the complex salt to the desired concentration. The lower the concentration of caustic soda in the solution below the optimum, the greater will be the loss of sodium sulphate, while on the other hand the higher the concentration above the optimum the greater will be the contamination of the sodium sulphate by sodium chloride. The maximum solubility of the sodium chloride with the minimum solubility of sodium sulphate is obtained when the concentration of the final solution is about 21% NaOH or about 60° Twaddell. In general, the economic limits will be found to be between 16% NaOH and 26% NaOH, but as pointed out previously, the process of the invention is not limited to the use of the most desirable conditions.

In a typical case where the maximum recovery of relatively uncontaminated sodium sulphate is desired and where in the purification process 3 parts of sodium sulphate are added for each part of sodium chloride in the caustic solution to be purified, 4 parts of the complex salt containing about 20% water after treatment on a vacuum filter at 15 inches vacuum are brought into contact with 3 parts (by weight) of water. In this instance, the liquid obtained averages about 21% caustic soda. Under other conditions, adjustment to meet the given condition may be made in the ratio of water added to complex salt to produce the desired concentration of caustic soda in the solution. It is preferable to agitate the solution and suspended crystals for a period of fifteen to twenty minutes in order to obtain complete solution of the sodium chloride.

The process may be carried out by a batch method or continuously. By the former, the accumulated complex salt separated from the purified caustic soda solution is treated with water in the desired ratio in a mixer, preferably of the vertical type, such as an ordinary cylindrical tank equipped with an agitating device. After fifteen to twenty minutes of agitation, the resulting solution and suspended solids are transferred to a suitable separating apparatus, such as a stationary or a continuous vacuum filter, or a settling tank, for example, a conical bottomed tank, from which the clear solution may be drawn off from the top while the sludge is removed from the bottom. The solution is returned to the evaporators for concentration of the caustic soda. The recovered solids, consisting for the most part of sodium sulphate, are used again in the purification process either in the form of a powder after drying, in the form of paste as obtained after separation, or in the form of a suspension in concentrated caustic soda solution, for example, a 50% solution.

The process is particularly applicable for use in conjunction with a process where the complex salt is separated continuously from the purified caustic soda solution, for instance by a vacuum rotary filter. The complex salt from the filter or if desired from storage is allowed to drop into a mixer to which is added the necessary amount of water or aqueous solution as hereinbefore described. The mixer is preferably of the horizontal type and the complex salt and selective solvent are advantageously added continuously at one end, the solution and undissolved sodium sulphate overflowing at the opposite end. The mixer is preferably of such capacity that the material will remain therein for fifteen to twenty minutes, during which time the material is agitated to insure dissolution of the sodium chloride and caustic soda. The material obtained as the overflow from the mixer is discharged to suitable separating apparatus, preferably a rotary vacuum filter, the recovered sodium sulphate being used again in the purification process while the solution is returned to the evaporators.

In a typical case, 8400 pounds per hour of concentrated caustic soda solution containing 775 grams per litre of NaOH and 17 grams per litre of NaCl is reacted with 323 pounds of anhydrous sodium sulphate per hour. After the reaction has taken place and the crystalline product removed from the solution, a liquor is obtained containing 760 grams per litre of sodium hydroxide and 6 grams per litre of sodium chloride and sodium sulphate combined. The moist solids obtained average 800 pounds per hour and these are mixed with 600 pounds of water per hour for about fifteen to twenty minutes. The solution and suspended solids are then passed to a filter, the insoluble sodium sulphate separated from the solution by the filter amounting to 275 pounds per hour, or a recovery of 85%. The filtrate is passed to the evaporators while the solids are returned to the system and employed in correct proportions in the further purification of caustic soda solutions.

Considerable modification is possible in the physical factors and equipment employed without departing from the essential features of the present invention.

We claim:

1. The steps of treating the complex salt derived from the purification of concentrated caustic soda solutions by the addition of sodium sulphate thereto to form a substantially insoluble complex salt with sodium chloride and caustic soda and the removal of the complex salt from the solution, which comprise treating the complex salt with a selective solvent which dissolves sodium chloride and caustic soda therefrom, leaving at least a portion of the sodium sulphate undissolved, and thereafter separating the solids from the solution.

2. The steps of treating the complex salt derived from the purification of concentrated caustic soda solutions by the addition of sodium sulphate thereto to form a substantially insoluble complex salt with sodium chloride and caustic soda and the removal of the complex salt from the solution, which comprise treating at a temperature above 34° C. the complex salt with water in such amounts that sodium chloride and caustic soda are dissolved therefrom, leaving at least a portion of the sodium sulphate undissolved, and thereafter separating the solids from the solution.

3. The steps of treating the complex salt derived from the purification of concentrated caustic soda solutions by the addition of sodium sulphate thereto to form a substantially insoluble complex salt with sodium chloride and caustic soda and the removal of the complex salt from the solution, which comprise treating at a temperature above 34° C. the complex salt with water in such amounts that the sodium chloride and caustic soda are substantially completely dissolved therefrom without dissolving an appreciable amount of sodium sulphate, and thereafter separating the solids from the solution.

4. The steps of treating the complex salt derived from the purification of concentrated caustic soda solutions by the addition of sodium sulphate thereto to form a substantially insoluble complex salt with sodium chloride and caustic soda and the removal of the complex salt from the solution, which comprise treating at a temperature above 34° C. the complex salt with water in such amounts that the solution obtained is between 16% and 26% caustic soda to dissolve sodium chloride and caustic soda therefrom, leaving at least a portion of the sodium sulphate undissolved, and thereafter separating the undissolved sodium sulphate from the solution.

5. The steps of treating the complex salt derived from the purification of concentrated caustic soda solutions by the addition of sodium sulphate thereto to form a substantially insoluble complex salt with sodium chloride and caustic soda and the removal of the complex salt from the solution, which comprise treating at a temperature above 34° C. the complex salt with water in such amounts that the solution obtained is in the neighborhood of 21% caustic soda to dissolve the sodium chloride and caustic soda therefrom, leaving at least a portion of the sodium sulphate undissolved, and thereafter separating the undissolved sodium sulphate from the solution.

6. In the process of purifying concentrated caustic soda solutions involving the addition of sodium sulphate thereto to form a substantially insoluble complex salt with sodium chloride and caustic soda and the removal of the complex salt from the solution, the steps which comprise treating the complex salt with a selective solvent which dissolves sodium chloride and caustic soda therefrom, leaving at least a portion of the sodium sulphate undissolved, separating the solids from the solution, and thereafter re-using the recovered sodium sulphate in the process for the purification of further amounts of caustic soda solution.

7. In the process of purifying concentrated caustic soda solutions involving the addition of sodium sulphate thereto to form a substantially insoluble complex salt with sodium chloride and caustic soda and the removal of the complex salt from the solution, the steps which comprise treating at a temperature above 34° C. the complex salt with water in such amounts that sodium chloride and caustic soda are dissolved therefrom, leaving at least a portion of the sodium sulphate undissolved, separating the solids from the solution, and thereafter re-using the recovered sodium sulphate in the process for the purification of further amounts of caustic soda solution.

8. In the process of purifying concentrated caustic soda solutions involving the addition of sodium sulphate thereto to form a substantially insoluble complex salt with sodium chloride and caustic soda and the removal of the complex salt from the solution, the steps which comprise treating at a temperature above 34° C. the complex salt with water in such amounts that the sodium chloride and caustic soda are substantially completely dissolved therefrom without dissolving an appreciable amount of sodium sulphate, separating the solids from the solution, and thereafter re-using the recovered sodium sulphate in the process for the purification of further amounts of caustic soda solution.

9. In the process of purifying concentrated caustic soda solutions involving the addition of sodium sulphate thereto to form a substantially insoluble complex salt with sodium chloride and caustic soda and the removal of the complex salt from the solution, the steps which comprise treating at a temperature above 34° C. the complex salt with water in such amounts that the solution obtained is between 16% and 26% caustic soda to dissolve sodium chloride and caustic soda therefrom, leaving at least a portion of the sodium sulphate undissolved, separating the undissolved sodium sulphate from the solution, and thereafter re-using the recovered sodium sulphate in the process for the purification of further amounts of caustic soda solution.

10. In the process of purifying concentrated caustic soda solutions involving the addition of sodium sulphate thereto to form a substantially insoluble complex salt with sodium chloride and caustic soda and the removal of the complex salt from the solution, the steps which comprise treating at a temperature above 34° C. the complex salt with water in such amounts that the solution obtained is in the neighborhood of 21% caustic soda to dissolve the sodium chloride and caustic soda therefrom, leaving at least a portion of the sodium sulphate undissolved, separating the undissolved sodium sulphate from the solution, and thereafter re-using the recovered sodium sulphate in the process for the purification of further amounts of caustic soda solution.

11. In the process of purifying concentrated caustic soda solutions involving the addition of sodium sulphate thereto to form a substantially insoluble complex salt with sodium chloride and caustic soda and the removal of the complex salt from the solution, the steps which comprise treating the complex salt with a selective solvent which dissolves sodium chloride and caustic soda therefrom, leaving at least a portion of the sodium sulphate undissolved, separating the solids from the solution, suspending the recovered sodium sulphate in concentrated caustic soda solution, and thereafter re-using it in the process for the purification of further amounts of caustic soda solution.

12. In the process of purifying concentrated caustic soda solutions involving the addition of sodium sulphate thereto to form a substantially insoluble complex salt with sodium chloride and caustic soda and the removal of the complex salt from the solution, the steps which comprise treating at a temperature above 34° C. the complex salt with water in such amounts that sodium chloride and caustic soda are dissolved therefrom leaving at least a portion of the sodium sulphate undissolved, separating the solids from the solution, suspending the recovered sodium sulphate in concentrated caustic soda solution, and thereafter re-using it in the process for the purification of further amounts of caustic soda solution.

RAYMON E. VAN DER COOK.
EARL SWEETLAND.